(12) United States Patent
Dluzen et al.

(10) Patent No.: US 12,485,915 B2
(45) Date of Patent: Dec. 2, 2025

(54) VEHICLE MONITORING APPARATUS AND METHOD

(71) Applicant: International Truck Intellectual Property Company, LLC, Lisle, IL (US)

(72) Inventors: Eric Michael Dluzen, Aurora, IL (US); Michael Turner, Washington Township, MI (US); Joshua Dean Lebar, Oak Park, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 33 days.

(21) Appl. No.: 18/242,821

(22) Filed: Sep. 6, 2023

(65) Prior Publication Data

US 2025/0074441 A1    Mar. 6, 2025

(51) Int. Cl.
*B60Q 1/00* (2006.01)
*B60W 10/20* (2006.01)
(Continued)

(52) U.S. Cl.
CPC ............ *B60W 50/14* (2013.01); *B60W 10/20* (2013.01); *B60W 30/09* (2013.01); *B64U 80/86* (2023.01);
(Continued)

(58) Field of Classification Search
CPC ...... B60W 50/14; B60W 10/20; B60W 30/09; B60W 2050/146; B60W 2300/145;
(Continued)

(56) References Cited

U.S. PATENT DOCUMENTS

| 5,530,421 A | 6/1996 | Marshall et al. |
| 8,120,476 B2 | 2/2012 | Chen et al. |

(Continued)

FOREIGN PATENT DOCUMENTS

| DE | 102017206601 A1 * | 10/2018 | |
| EP | 3379513 A1 * | 9/2018 | ....... G08G 1/096791 |

OTHER PUBLICATIONS

Helfrich, Emma. "Drone Swarm Launcher Truck Displayed at China's Big Arms Expo," https://www.thedrive.com/the-war-zone/drone-swarm-launcher-truck-displayed-at-chinas-big-arms-expo, published Nov. 5, 2022, accessed Jul. 28, 2023 (6 pages).

(Continued)

*Primary Examiner* — Toan N Pham
(74) *Attorney, Agent, or Firm* — Umang Khanna

(57) ABSTRACT

A vehicle including a monitoring apparatus comprising a drone housing and a drone configured to be stowable in the drone housing and deployable for flying adjacent to the vehicle. The drone comprising a frame, at least one rotor connected to the frame, and at least one sensor connected to the frame. The at least one sensor is configured to monitor an area adjacent to the vehicle when the drone is deployed and provide a feedback signal. The vehicle further comprises a control module operably connected to the drone. The control module is configured to output a warning signal to a driver of the vehicle which is indicative of a potential hazard. The warning signal is responsive to the feedback signal of the at least one sensor of the drone.

17 Claims, 9 Drawing Sheets

(51) Int. Cl.
  *B60W 30/09*     (2012.01)
  *B60W 50/14*     (2020.01)
  *B64U 80/86*     (2023.01)
  *B64U 101/30*    (2023.01)

(52) U.S. Cl.
  CPC . *B60W 2050/146* (2013.01); *B60W 2300/145* (2013.01); *B60W 2554/80* (2020.02); *B60W 2556/65* (2020.02); *B64U 2101/30* (2023.01); *B64U 2201/10* (2023.01)

(58) Field of Classification Search
  CPC .......... B60W 2554/80; B60W 2556/65; B64U 80/86; B64U 2101/30; B64U 2201/10
  See application file for complete search history.

(56) References Cited

U.S. PATENT DOCUMENTS

| | | | | |
|---|---|---|---|---|
| 10,112,710 | B2* | 10/2018 | Duncan | ................. B64U 80/86 |
| 2011/0018699 | A1 | 1/2011 | Chen et al. | |
| 2014/0257595 | A1* | 9/2014 | Tillmann | ............... B64U 10/14 701/2 |
| 2018/0346116 | A1* | 12/2018 | Kundu | ................. B60W 40/06 |
| 2021/0183244 | A1* | 6/2021 | Malhan | .................... G08G 1/09 |
| 2024/0241520 | A1* | 7/2024 | Araujo | .................. B64U 50/37 |

OTHER PUBLICATIONS

Kang, et al. "Protect your Sky: A Survey of Counter Unmanned Aerial Vehicle Systems," IEEE Access, vol. 8, 2020 (40 pages).

Nichols, Greg. "The 5 best survelliance drones: Next-level inspection UAVs," ZDNet, https://www.zdnet.com/article/best-surveillance-drone/, published May 20, 2022, accessed Jul. 28, 2023. (31 pages).

"Three Ways Drones Elevate the Vehicle Industry," https://www.ces.tech/articles/2020/august/three-ways-drones-elevate-the-vehicle-industry.aspx, published Aug. 11, 2020, accessed Jul. 28, 2023 (2 pages).

Fennelly, et al. "Unmanned aerial vehicle (drone) usage in the 21st century," Handbook of Loss Prevention and Crime Prevention, pp. 161-164, 2020.

* cited by examiner

VEHICLE MONITORING APPARATUS AND METHOD

BACKGROUND

This disclosure relates to a vehicle monitoring apparatus for assisting a driver of a vehicle. Particularly, this disclosure relates to systems and methods for monitoring a vehicle by an aerial drone which is stowable on the vehicle.

RELATED ART

Modern vehicles include an array of onboard sensors for assisting the driver as he performs various maneuvers. Such monitoring systems help the driver identify other vehicles, objects in the roadway, and pedestrians so that the driver may then change the vehicle's speed and direction to avoid an accident. Some monitoring systems include optical sensors, such as side and/or rear cameras, which thereby allow the driver to view a certain area surrounding the vehicle.

It is generally more difficult to monitor the surroundings of large tow vehicles, such as trucks with trailers, given their larger breadth. Additionally, due to the structure of the truck or the trailer, it may be impossible to position an optical sensor at the requisite location in order to view a certain area. Typically, the driver must exit the truck's cabin and walk around the truck and trailer to visually inspect any potential hazards. Furthermore, even after physically inspecting the surrounding area, the driver may need to lean out the window, use auxiliary mirrors, and rely on muscle memory or instinct to perform a particular maneuver.

SUMMARY

According to one embodiment, a vehicle comprises a monitoring apparatus. The vehicle includes a drone housing and a drone configured to be stowable in the drone housing and deployable for flying adjacent to the vehicle. The drone has a frame, at least one rotor connected to the frame, and at least one sensor connected to the frame. The at least one sensor is configured to monitor an area adjacent to the vehicle when the drone is deployed and provide a feedback signal. The vehicle further comprises a control module operably connected to the drone. The control module is configured to output a warning signal to a driver of the vehicle which is indicative of a potential hazard. The warning signal is responsive to the feedback signal of the at least one sensor of the drone.

According to another embodiment, a monitoring apparatus for a vehicle comprises a drone configured to be stowable on the vehicle and deployable for flying adjacent to the vehicle. The drone comprises a frame, at least one rotor connected to the frame, and at least one sensor connected to the frame. The at least one sensor is configured to monitor an area adjacent to the vehicle when the drone is deployed and provide a feedback signal. The monitoring apparatus also comprises a control module operably connected to the drone. The control module is configured to output a warning signal to a driver of the vehicle which is indicative of a potential hazard. The warning signal is responsive to the feedback signal of the at least one sensor of the drone.

According to yet another embodiment, a method for monitoring a vehicle includes several steps. The method includes a step of providing a drone comprising a frame, at least one rotor connected to the frame, and at least one sensor connected to the frame, and a control module operably connected to the drone. The method also includes the steps of stowing the drone on the vehicle, deploying the drone so that the drone flies adjacent to the vehicle, and monitoring, by the at least one sensor of the drone, an area adjacent to the vehicle. The method includes a further step of outputting a warning signal, by the control module, to a driver of the vehicle responsive to the feedback signal of the at least one sensor of the drone. The warning signal is indicative of a potential hazard.

DETAILED DESCRIPTION

Figure 1:
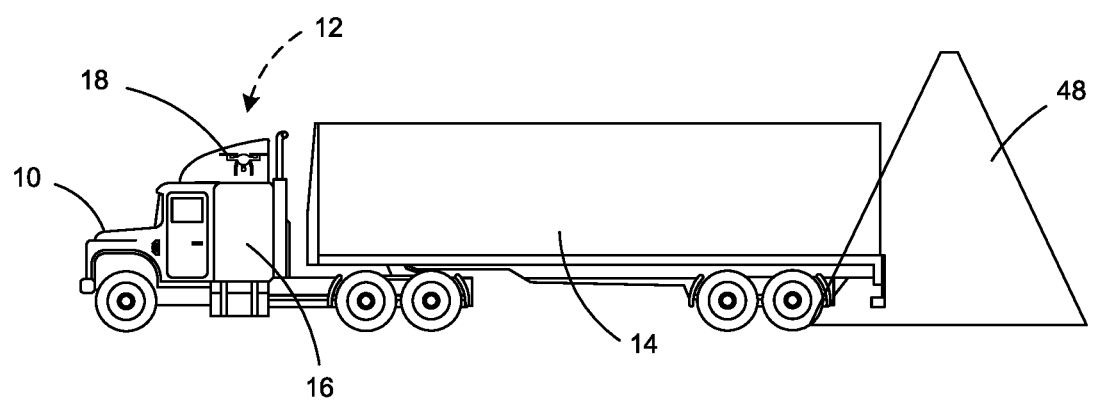
FIG. 1 is a side view of an embodiment of a vehicle of the present disclosure which includes a payload and an aerial drone vehicle monitoring apparatus for monitoring the vehicle, as described herein.
Figure 2:
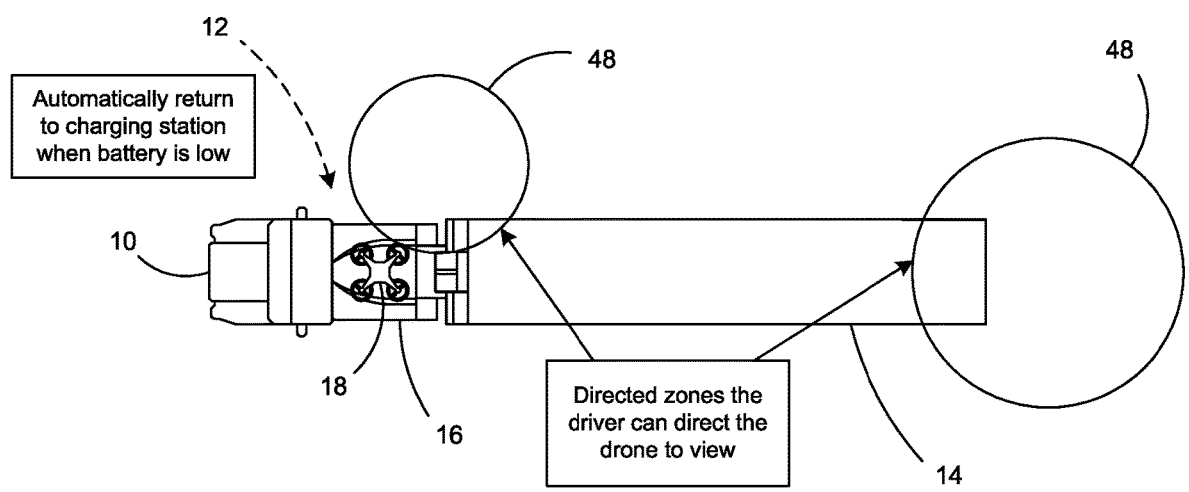
FIG. 2 is a top view of the vehicle and the monitoring apparatus thereof, as described herein.

Embodiments described herein relate to arrangements, and control logic therefor, of a vehicle monitoring apparatus for efficiently monitoring the vehicle and its environment using an onboard aerial drone. The apparatus and method may be applied to various types of passenger vehicles, commercial vehicles, and recreational vehicles, such as highway or semi-tractors, straight trucks, busses, fire trucks, motorhomes, and etcetera. It is contemplated that the apparatus and method may be applied to vehicles having drivetrains including a diesel, gasoline, or gaseous fuel engine, as well as to vehicles having electric or hybrid electric drivetrains. It is further contemplated that the apparatus and method may be applied to vehicles having manual transmissions, automatic transmissions, automated manual transmissions, continuously variable transmissions, hybrid electric transmissions, and hydraulic transmissions, as non-limiting examples. It is further contemplated that the apparatus and method may be applied to autonomous or semi-autonomous vehicles.

The present monitoring apparatus and method assist the driver of the vehicle by monitoring the environment of the vehicle in real time. Furthermore, the monitoring apparatus can process sensed data and output a display to the driver which illustrates the vehicle, the environment thereof, and a suggested course of action to avoid any potential hazards.

Turning now to FIGS. 1-4, a vehicle 10 implementing an embodiment of the present monitoring apparatus 12 is shown. The vehicle 10 can be in the form of a tow vehicle 10 for transporting a payload 14. For instance, the vehicle 10 can be a truck 10 with a trailer 14 attached thereto. The vehicle 10 may also include a cab 16 for housing the driver. The cab 16 may also house or otherwise support the monitoring apparatus 12. It is conceivable that the monitoring apparatus 12 could be mounted on the trailer 14.

The monitoring apparatus 12 includes a drone 18, a drone housing 20, and a control module 22 for monitoring the vehicle 10, its payload 14, and/or the environment surrounding the vehicle 10 and/or payload 14. The monitoring apparatus 12 allows drivers to easily perform various maneuvers, without the need to physically inspect the environment themselves. The monitoring apparatus 12 provides a complete 360-degree range of visibility around the vehicle 10, including any area adjacent to the vehicle 10 and/or the payload 14. The monitoring apparatus 12 also processes sensed data and provides an output to the driver to inform the driver on where to position his vehicle 10 and/or payload 14. The output may be in the form of a display 24 which illustrates the vehicle 10 and any potential hazards. The display 24 may further illustrate an adjusted overlay of the vehicle 10 and/or the environment which shows how and where the vehicle 10 should be positioned to avoid any potential hazards. The overlay may be in the form of a projected vehicle position 26, which includes both vehicle 10 and payload 14, as illustrated on the display 24 of FIG. 3. The monitoring apparatus 12 allows a user to more easily perform any maneuver, especially in situations with low visibility. The various maneuvers may include a maneuver to avoid a potential hazard or simply navigate a particular turn, such as when turning at a low speed or backing up the truck 10 and trailer 14 into a given parking or loading spot. The monitoring apparatus 12 also assists the driver in poorly lit or unsafe areas. Thereby, the driver may rely on the monitoring apparatus 12 and remain in the safety of his vehicle 10.

As used herein, the term potential hazard may refer to any roadway condition, any undesired contact points between the truck 10 and trailer 14, any weather condition, and/or any object, including other vehicles. Further, as used herein, the term area adjacent to the vehicle 10 which the monitoring apparatus 12 monitors may refer to any area that is above, below, in front of, behind, and/or next to the vehicle 10.

The vehicle 10 may include a controller 28 and various sensors 30 operably coupled to the controller 28. The various sensors 30 can include on-board sensors, off-board sensors, or other devices for sensing or otherwise identifying vehicle payload, vehicle speed, vehicle GPS location data, tire pressure, fuel supply to the engine, engine and/or driveshaft torque, other vehicle data or characteristics, forecasted or projected traffic speed, roadway or map data, geographical data, and/or weather data. Further, the vehicle 10 may include one or more distance sensors for identifying a distance between the vehicle 10 and a potential hazard. The vehicle 10 may also include a vehicle-to-vehicle (V2V) communication device for identifying and communicating with the V2V devices of other vehicles (not shown). The distance sensor may be a radar sensor, LIDAR sensor, or optical sensor. The controller 28 can also be in communication with one or more remote databases via a network. The database(s) may include map data, geographical data, traffic data, and/or weather data. The controller 28 can also be in communication with a user interface, such as the display 24. The controller 28 may or may not incorporate the control module 22 of the monitoring apparatus 12.

Figure 3:
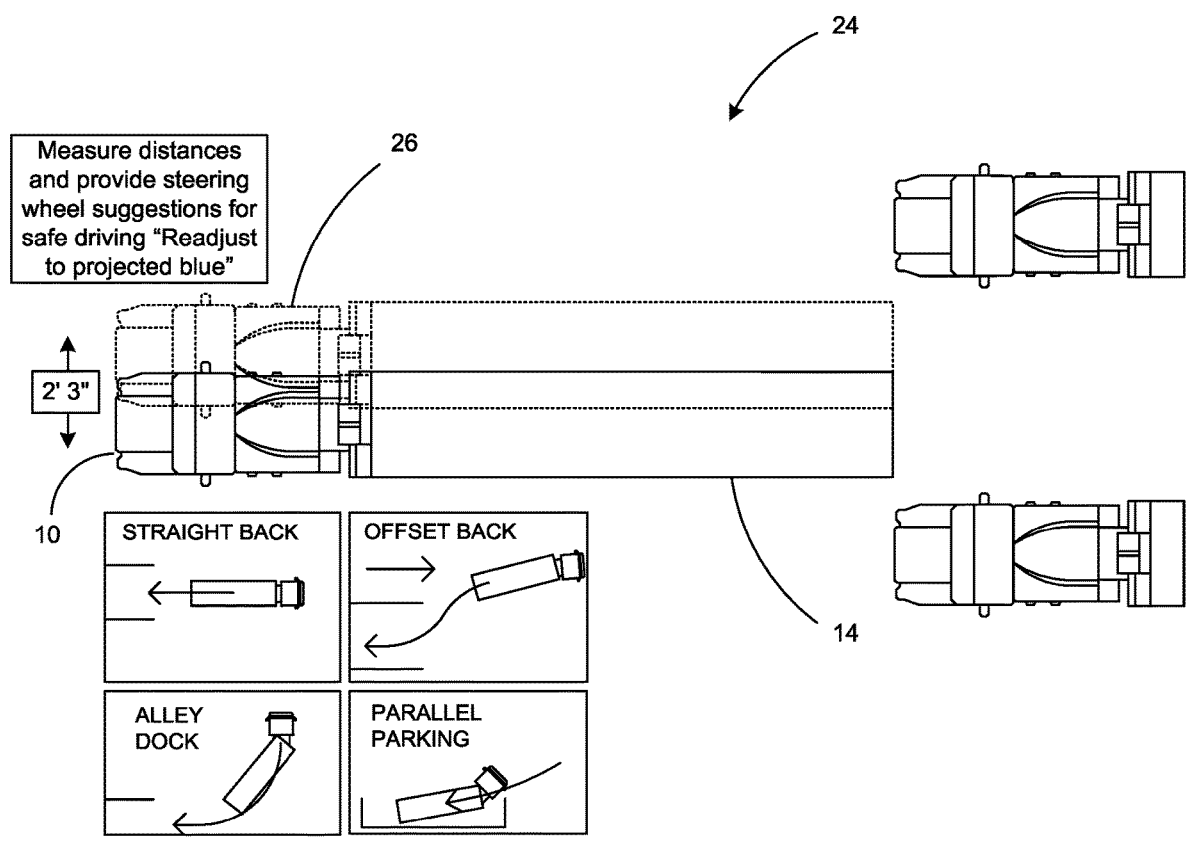
FIG. 3 is a graphical representation of a display screen of the vehicle, which illustrates the environment and suggested course changes generated by the monitoring apparatus, as described herein.

The display 24 can be an audio and/or visual display. For instance, the display 24 can be in the form of a display screen 24 embedded in the dash of the vehicle 10 or projected onto the windshield. The display screen 24 is operably connected to the control module 22 and/or directly to the drone 18. The display screen 24 is configured to display the data provided by the drone 18 in real time. As shown in FIG. 3, the display 24 may illustrate the vehicle 10 and its payload 14, potential hazards, including other vehicles (unnumbered), a potential route for performing a certain maneuver, the vehicle overlay of the projected vehicle position 26, and/or a turn radius and/or distance needed to position the vehicle 10 at the projected vehicle position 26, which are each based at least in part upon the sensed data provided by the drone 18. For example, as shown in FIG. 3, the control module 22 may output a suggested steering maneuver of turning to the right by 2 feet and 3 inches (68 cm) based at least in part upon the sensed drone data and accordingly display the distance and suggested course of action on the display screen 24.

Figure 4:
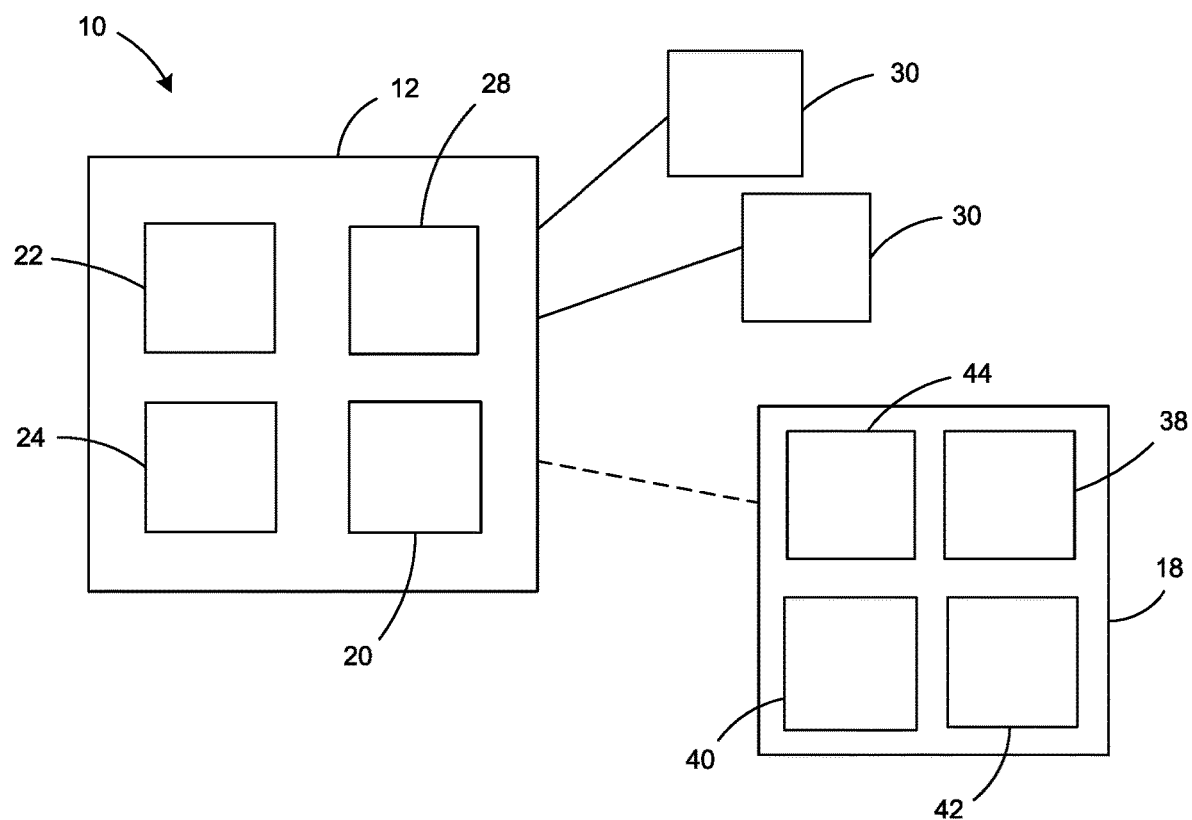
FIG. 4 is a graphical representation of the monitoring apparatus, as described herein.
Figure 5A:
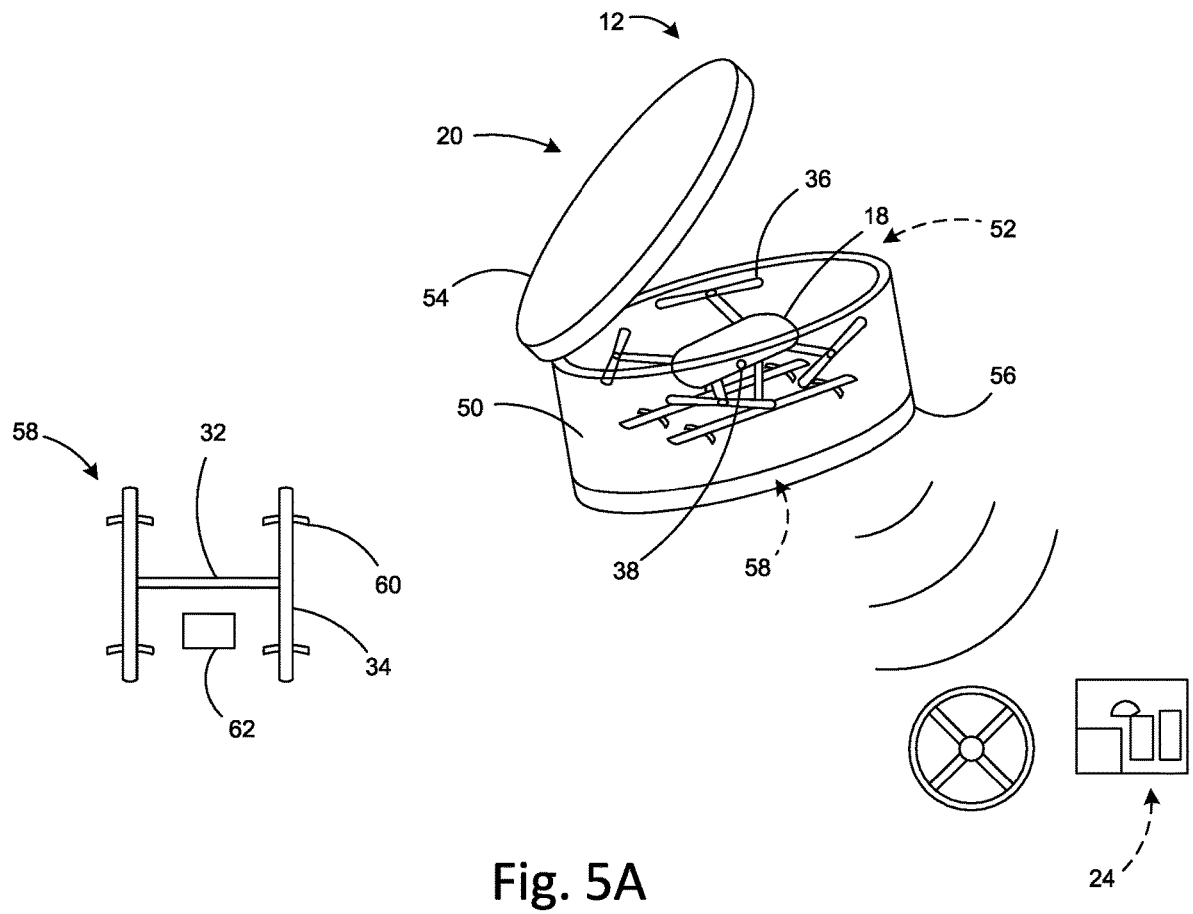
FIGS. 5A-5B illustrate the drone of the monitoring apparatus, as described herein.
Figure 5B:
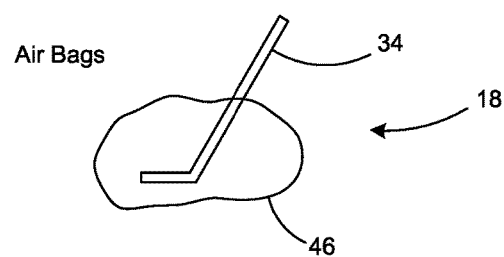

The drone 18 is configured to be stowable in the drone housing 20 and deployable for flying adjacent to the vehicle 10. The drone 18 includes a frame 32, legs 34 connected to the frame 32, at least one rotor 36 connected to the frame 32, for example four rotors 36, and at least one monitoring sensor 38 connected to the frame 32 (FIG. 5A). The drone 18 may further include an autopilot control module 40, additional sensors 42, such as gyroscopes, heat sensors, GPS location sensors, etc., communication devices, and/or a rechargeable battery 44 (FIGS. 4 and 5A). Airbags 46 may be coupled to the legs 34 of the drone 18 (FIG. 5B). The airbags 46 may be configured such that, when inflated, they lock the drone 18 within the drone housing 20 by pressing against or engaging with a feature of the drone housing 20. The feature of the drone housing 20 may be a lip, ridge, or recess, for non-limiting example. Alternately, the airbags 46 may be attached to the drone housing 20, and may be configured such that, when inflated, they engage the legs 34 of the drone 18 so as to lock the drone 18 within the drone housing 20.

Each sensor 38 of the drone 18 is configured to monitor an area adjacent to the vehicle 10 when the drone 18 is deployed. Each sensor 38 also provides a feedback signal to the autopilot control module 40, the control module 22, and/or the vehicle controller 28. Each sensor 38 can be a radar sensor, LIDAR sensor, or optical sensor such as a camera.

The autopilot control module 40 is in communication with the various sensors 38, 42 of the drone 18, the control module 22 of the monitoring apparatus 12, and the vehicle controller 28. The autopilot control module 40 can be a separate control module located on the drone 18 or it may be at least partially incorporated into the control module 22 of the monitoring apparatus 12 and/or the vehicle controller 28. The autopilot control module 40 allows the drone 18 to autonomously or semi-autonomously operate. Further, the control module 22 and/or the autopilot control module 40 may operate individually and/or in cooperation to dynamically track the drone as the vehicle 10 and its trailer 14 moves at low speeds in parking lots. The autopilot control module 40 may comprise one or more processors for processing the feedback signals of the various sensors 38, 42. The autopilot control module 40 may also automatically fly the drone 18 back to its housing 20 when the battery life of the battery 44 of the drone 18 drops below a predetermined threshold.

The control module 22 of the monitoring apparatus 12 is operably connected to the drone 18. For instance, the control module 22 can be operably connected to the monitoring sensor 38 and/or the autopilot control module 40. The control module 22 is also operably connected to the vehicle controller 28. The control module 22 may include one or more processors for processing the sensed data from the vehicle 10 and/or the drone 18. The control module 22 is configured to output a warning signal to the driver, which is indicative of a potential hazard. The control module 22 is further configured to output a steering signal indicative of a steering adjustment to avoid the potential hazard. The warning signal is responsive to the feedback signal of the monitoring sensor of the drone 18. Upon receiving the feedback signal of the sensor(s) 38, 42 or other sensors 30 of the vehicle 10, the control module 22 will identify any potential hazards in the surrounding area or environment of the vehicle 10 and/or payload 14. If there is a potential hazard, the control module 22 will calculate a distance between the vehicle 10 and the potential hazard based at least in part upon the feedback signal of the monitoring sensor 38. Thereafter, the control module 11 will determine the current trajectory and generate a new, corrected trajectory for avoiding any potential hazard. The control module 22 may then generate a live display 24 of the vehicle 10 and the area adjacent to the vehicle 10 based at least in part upon the feedback signal of the monitoring sensor 38 of the drone 18 and the calculated distance between the vehicle 10 and the potential hazard.

The control module 22 may further be configured to generate dedicated monitoring zones 48 adjacent to the vehicle 10. Each dedicated monitoring zone 48 can be keyed to a specific area associated with the vehicle 10 or its payload 14. The control module 48 can send at least one command signal to the drone 18 so that the drone 18 flies to and monitors the dedicated monitoring zones 48. Thereby, the drone 18 may automatically navigate itself to the dedicated monitoring zones 48. Additionally, or alternatively, the driver may select one or more dedicated zones 48 from a menu in the display 24 which then directs the drone 18 to the selected zone 48.

In operation, the control module 22 may perform the following method. As an initial state, the control module 22 may stow the drone 18 on the vehicle 10. Then, the drone 18 may be deployed so that the drone 18 flies adjacent to the vehicle 10. The drone 18 can be deployed automatically by the control module 22 upon sensing a certain velocity, turning maneuver, and/or dimly lit area. Additionally, the drone 18 can be deployed upon the control module 22 receiving an input command from the driver. The control module 22 will then commence monitoring the area adjacent to the vehicle 10 and/or payload 14 by the sensor(s) 38 of the drone 18. The control module 22 may direct the drone 18 to fly to the dedicated monitoring zones 48 and/or perform a sweep of the vehicle 10 and/or payload 14. The control module 22 may then identify any potential hazards. Whether or not any potential hazards are identified, the control module 22 may output a steering signal to the driver to assist them in steering the vehicle 10 in a given maneuver. If a potential hazard is identified, then the control module 22 will output a warning signal, indicative of the potential hazard, to the driver which is responsive to the feedback signal of the sensor(s) 38, 42 of the drone 18. Further, if a potential hazard is identified, the control module 22 may output a steering signal which is indicative of a steering adjustment to avoid the potential hazard. The steering signal may be based at least upon the determined hazard, the real-time distance between the hazard and the vehicle 10 and/or payload 14, and/or any other vehicle characteristic, e.g., velocity, engine torque, position of the steering wheel, etc. The control module 22 may further output a display 24, such as a live map or graphic, which illustrates the current position of the vehicle 10 and/or payload 14 relative to any potential hazard and the environment thereof the overlay of the projected position 26, which thereby clearly illustrates the desired change in position and how to achieve the desired position.

Figure 6:
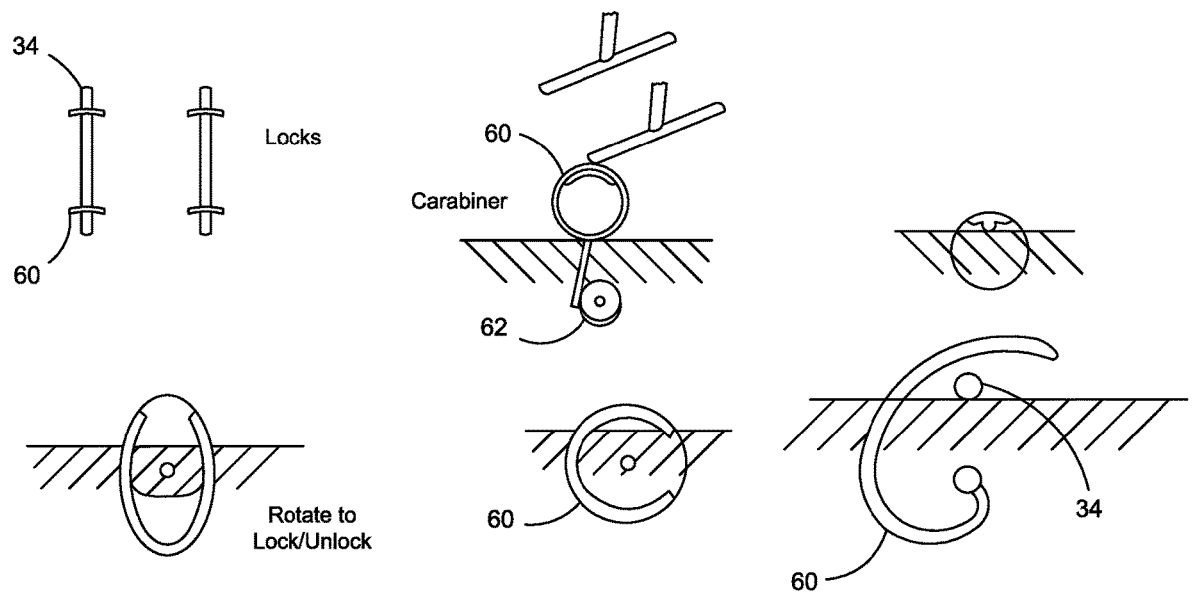
FIG. 6 is a graphical representation of an embodiment of a locking mechanism of the housing for the drone of the monitoring apparatus, as described herein.
Figure 7:
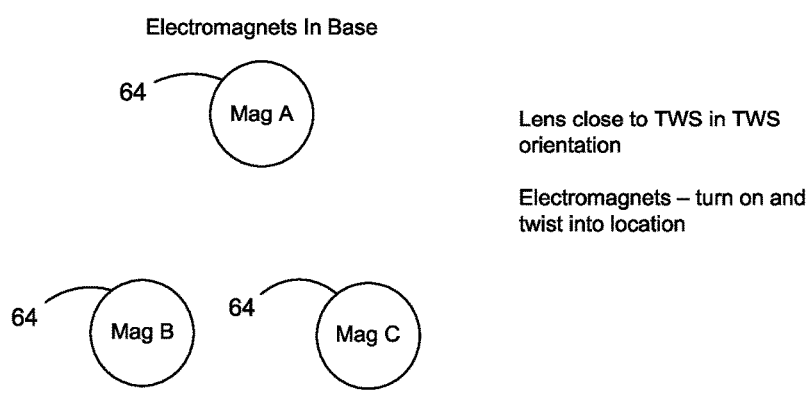
FIG. 7 is a graphical representation of another embodiment of a locking mechanism of the housing for the drone of the monitoring apparatus, as described herein.

Referring now to FIGS. 5-7, there is shown an embodiment of a drone housing 20. The drone housing 20 can be connected to and/or incorporated as part of the vehicle, e.g., the cab 16. The drone housing 20 includes a frame 50 with an internal compartment 52 configured to receive the drone 18, a selectively closable door 54 connected to the frame 50, a wireless charging station 56 configured to charge the battery 44 of the drone 18, and a locking mechanism 58 configured to selectively lock the drone 18 within the internal compartment 52.

The locking mechanism 58 may comprise rotatable locking members 60, e.g., carabiners, that engage with the legs 34 of the drone 18 (FIG. 6). The locking mechanism 58 may also include one or more motors 62 connected to the locking members 60. Therein, upon receiving a lock or unlock input signal from the control module 22, the motor(s) 62 will rotate the locking members 60 to lock or unlock the drone 18. Alternatively to a physical locking member 60, the locking mechanism 58 may comprise one or more electromagnets 64 that selectively lock the feet 34 of the drone 18 (FIG. 7). For instance, the base or floor of the drone housing 20 may include three electromagnetics 64 for electromagnetically holding the drone 18 within the internal compartment 52 of the drone housing 20.

Figure 8:
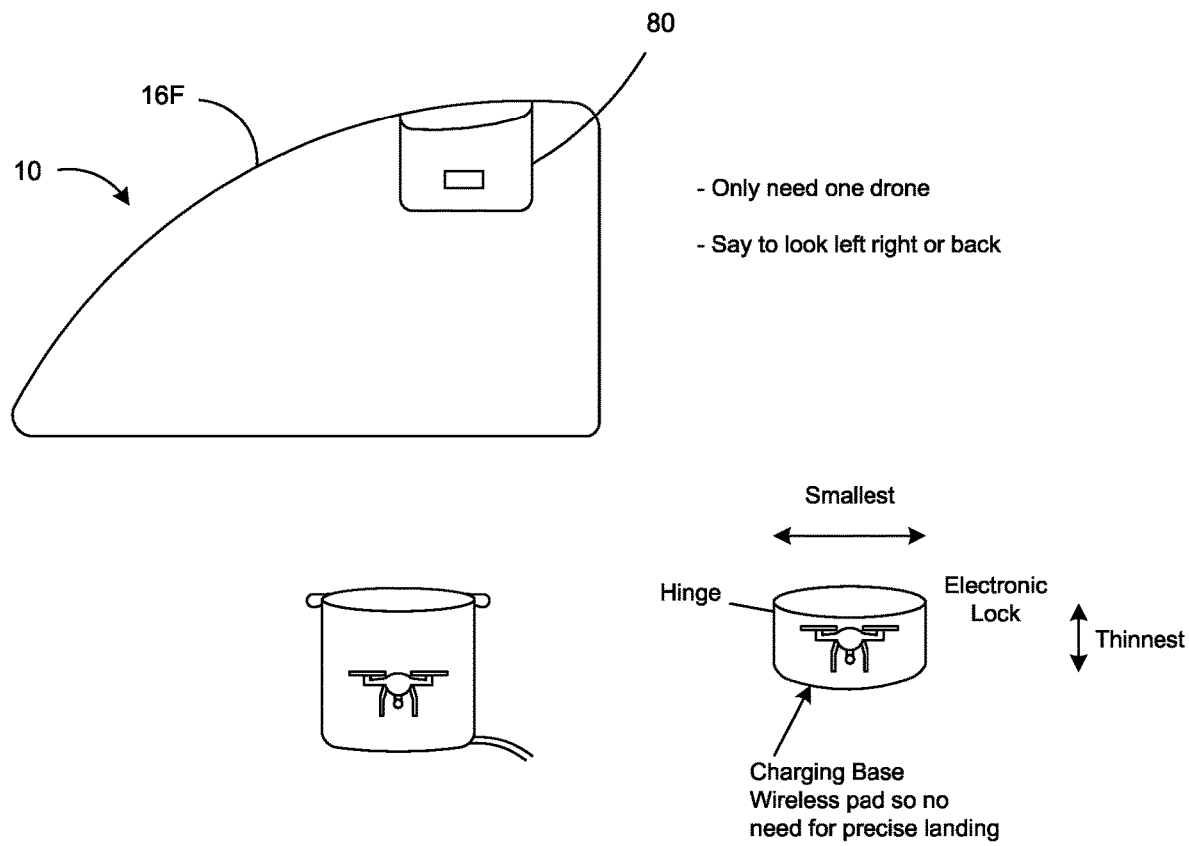
FIG. 8 is an embodiment of the housing for the drone of the monitoring apparatus, as described herein.

Referring now to FIG. 8, there is shown another embodiment of a drone housing 80. The drone housing 80 may be substantially similar to the drone housing 20 as discussed above. The drone housing 80 is disposed within the roof fairing 16F of the cab 16. The housing 80 may extend downwardly and within the roof fairing 16F. The housing 80 may also have a relatively shallow depth which corresponds to the overall height of the drone 18. Alternatively, the housing 80 may have a greater depth for easily accommodating the drone 18.

Figure 9:
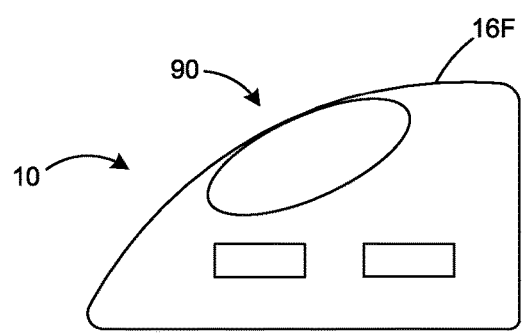
FIG. 9 is another embodiment of the housing for the drone of the monitoring apparatus, as described herein.

Referring now to FIG. 9, there is shown another embodiment of a drone housing 90, which may be substantially similar to the drone housing 20 as discussed above. The drone housing 90 is incorporated into the roof fairing 16F, near the front thereof. The automatic door (unnumbered) of the housing 90 can be flush and match the surface profile of the surrounding body of the roof fairing 16F.

Figure 10:
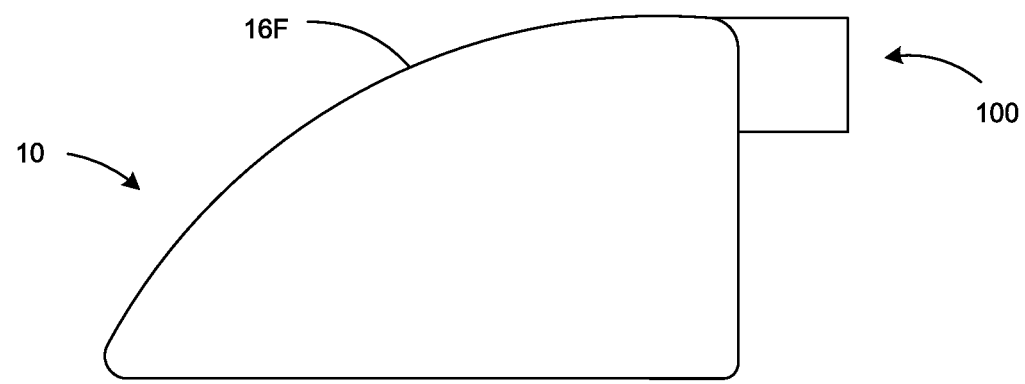
FIG. 10 is another embodiment of the housing for the drone of the monitoring apparatus, as described herein.

Referring now to FIG. 10, there is shown another embodiment of a drone housing 100, which may be substantially similar to the drone housing 20 as discussed above. The drone housing 100 is attached to the distal end of the roof fairing 16F. The drone housing 100 may extend rearwardly from the roof fairing 16F. Thus, the drone housing 100 does not substantially interfere with the aerodynamics of the roof fairing 16F.

Figure 11:
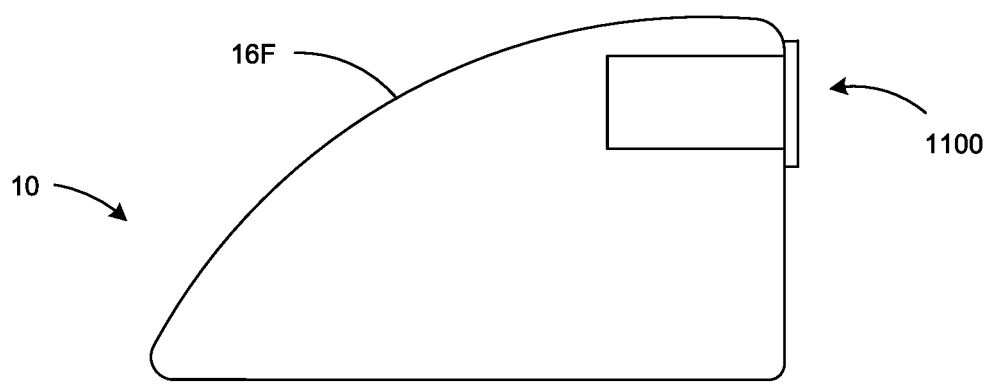
FIG. 11 is another embodiment of the housing for the drone of the monitoring apparatus, as described herein.

Referring now to FIG. 11, there is shown another embodiment of a drone housing 1100, which may be substantially similar to the drone housing 20 as discussed above. The drone housing 1100 is attached to and imbedded within the end of the roof fairing 16F. Therein, the drone housing 1100 extends into the end of the roof fairing 16F.

Figure 12A:
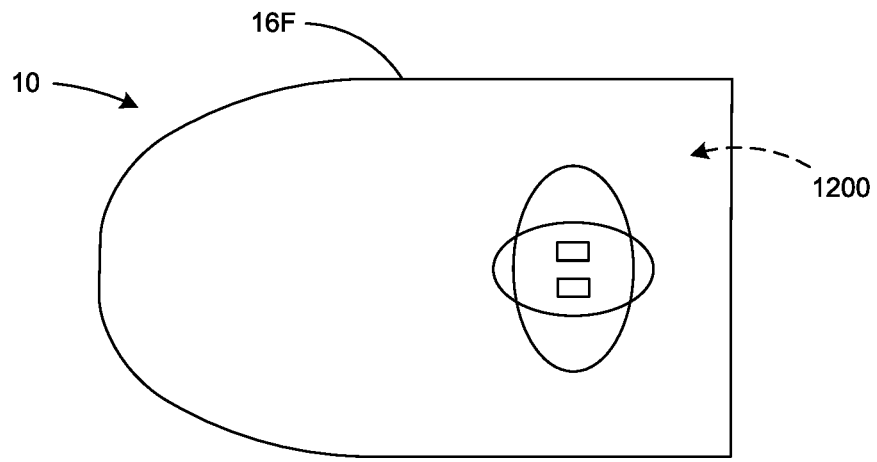
FIG. 12A-12B illustrate another embodiment of the housing for the drone of the monitoring apparatus, as described herein.
Figure 12B:
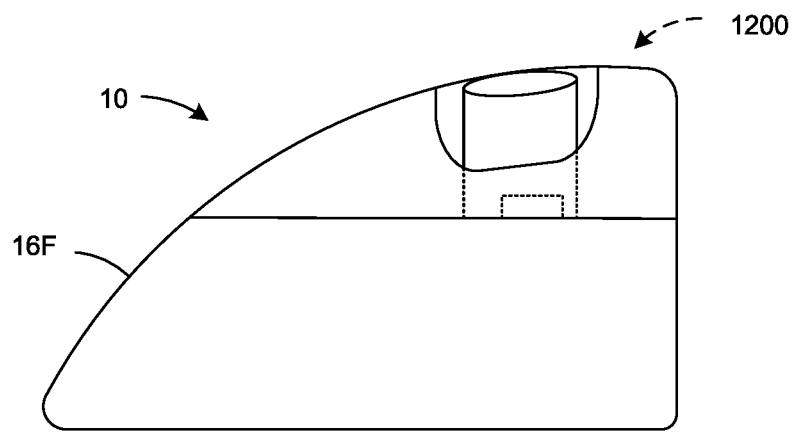

Referring now to FIGS. 12A-12B, there is shown another embodiment of a drone housing 1200 for housing two or more drones 18. The drone housing 1200 may be substantially similar to the drone housing 20 as discussed above. The drone housing 1200 is embedded within the top of the roof fairing 16F of the cab 16. The drone housing 1200 has a relatively large and oblong automatic door (unnumbered) for receiving the two drones.

While illustrative arrangements, and control logic therefor, implementing the monitoring apparatus have been described with respect to at least one embodiment, the arrangements and methods can be further modified within the spirit and scope of this disclosure, as demonstrated previously. This application is therefore intended to cover any variations, uses, or adaptations of the arrangement and method using its general principles. Further, this application is intended to cover such departures from the present disclosure as come within known or customary practice in the art to which the disclosure pertains and which fall within the limits of the appended claims.

What is claimed is:

1. A vehicle having a monitoring apparatus, comprising:
   a drone housing;
   a drone configured to be stowable in the drone housing and deployable for flying adjacent to the vehicle, the drone comprising:
   a frame;
   at least one rotor connected to the frame; and
   at least one sensor connected to the frame, the at least one sensor configured to monitor an area adjacent to the vehicle when the drone is deployed and provide a feedback signal; and
   a control module operably connected to the drone, the control module configured to output a warning signal to a driver of the vehicle which is indicative of a potential hazard, and the warning signal is responsive to the feedback signal of the at least one sensor of the drone;
   the control module further configured to output a steering signal indicative of a steering adjustment to avoid the potential hazard.

2. The vehicle of claim 1, further comprising:
   a display screen operably connected to the control module, the display screen configured to display the feedback signal of the at least one sensor of the drone in real time.

3. The vehicle of claim 1, wherein:
   the control module is configured to calculate a distance between the vehicle and the potential hazard based at least in part upon the feedback signal of the at least one sensor of the drone.

4. The vehicle of claim 3, wherein:
   the control module is configured to generate a live display of the vehicle and the area adjacent to the vehicle based at least in part upon the feedback signal of the at least one sensor of the drone and the calculated distance between the vehicle and the potential hazard.

5. The vehicle of claim 1, wherein:
   the control module is further configured to:
   dynamically track the location of the drone;
   generate dedicated monitoring zones adjacent to the vehicle; and
   send at least one command signal to the drone so that the drone flies to and monitors the dedicated monitoring zones to identify potential hazards around the vehicle.

6. The vehicle of claim 1, further comprising:
   a cab configured to house the driver; and
   the drone housing is connected to the cab.

7. The vehicle of claim 1, wherein:
   the drone housing comprises:
   a frame with an internal compartment configured to receive the drone;
   a selectively closable door connected to the frame;
   a charging station configured to charge a battery of the drone; and
   a locking mechanism configured to selectively lock the drone within the internal compartment.

8. The vehicle of claim 1, wherein:
   the vehicle is in the form of a truck which tows a payload; and
   the drone is configured to monitor the truck, the payload attached to the truck, and an area adjacent to the truck and the payload.

9. A monitoring apparatus for a vehicle, comprising:
   a drone configured to be stowable on the vehicle and deployable for flying adjacent to the vehicle, the drone comprising:
   a frame;
   at least one rotor connected to the frame; and
   at least one sensor connected to the frame, the at least one sensor configured to monitor an area adjacent to the vehicle when the drone is deployed and provide a feedback signal; and
   a control module operably connected to the drone, the control module configured to output a warning signal to a driver of the vehicle which is indicative of a potential hazard, and the warning signal is responsive to the feedback signal of the at least one sensor of the drone;
   the control module further configured to output a steering signal indicative of a steering adjustment to avoid the potential hazard.

10. The monitoring apparatus of claim 9, further comprising:
    a display screen operably connected to the control module, the display screen configured to display the feedback signal of the at least one sensor of the drone in real time.

11. The monitoring apparatus of claim 9, wherein:
    the control module is configured to calculate a distance between the vehicle and the potential hazard based at least in part upon the feedback signal of the at least one sensor of the drone.

12. The monitoring apparatus of claim 11, wherein:
    the control module is configured to generate a live display of the vehicle and the area adjacent to the vehicle based at least in part upon the feedback signal of the at least one sensor of the drone and the calculated distance between the vehicle and the potential hazard.

13. The monitoring apparatus of claim 9, wherein:
    the control module is further configured to:
    dynamically track the location of the drone;
    generate dedicated monitoring zones adjacent to the vehicle; and
    send at least one command signal to the drone so that the drone flies to and monitors the dedicated monitoring zones to identify potential hazards around the vehicle.

14. The monitoring apparatus of claim 9, further comprising:
    a drone housing configured to connect to a cab of the vehicle and to house the drone therein.

15. The monitoring apparatus of claim 14, wherein:
    the drone housing comprises:
    a frame with an internal compartment configured to receive the drone;
    a selectively closable door connected to the frame;
    a charging station configured to charge a battery of the drone; and
    a locking mechanism configured to selectively lock the drone within the internal compartment.

16. The monitoring apparatus of claim 9, wherein:
the vehicle is in the form of a truck which tows a payload; and
the drone is configured to monitor the truck, the payload attached to the truck, and an area adjacent to the truck and the payload.

17. A method for monitoring a vehicle, comprising the steps of:
providing a drone comprising a frame, at least one rotor connected to the frame, and at least one sensor connected to the frame, and a control module operably connected to the drone;
stowing the drone on the vehicle;
deploying the drone so that the drone flies adjacent to the vehicle;
monitoring, by the at least one sensor of the drone, an area adjacent to the vehicle; and
outputting a warning signal, by the control module, to a driver of the vehicle responsive to the feedback signal of the at least one sensor of the drone, the warning signal is indicative of a potential hazard; and
outputting a steering signal, by the control module, indicative of a steering adjustment to avoid the potential hazard.

* * * * *